A. A. GREEN.
LENGTH AND WIDTH MEASURING DEVICE.
APPLICATION FILED SEPT. 3, 1910.
1,099,597.
Patented June 9, 1914.
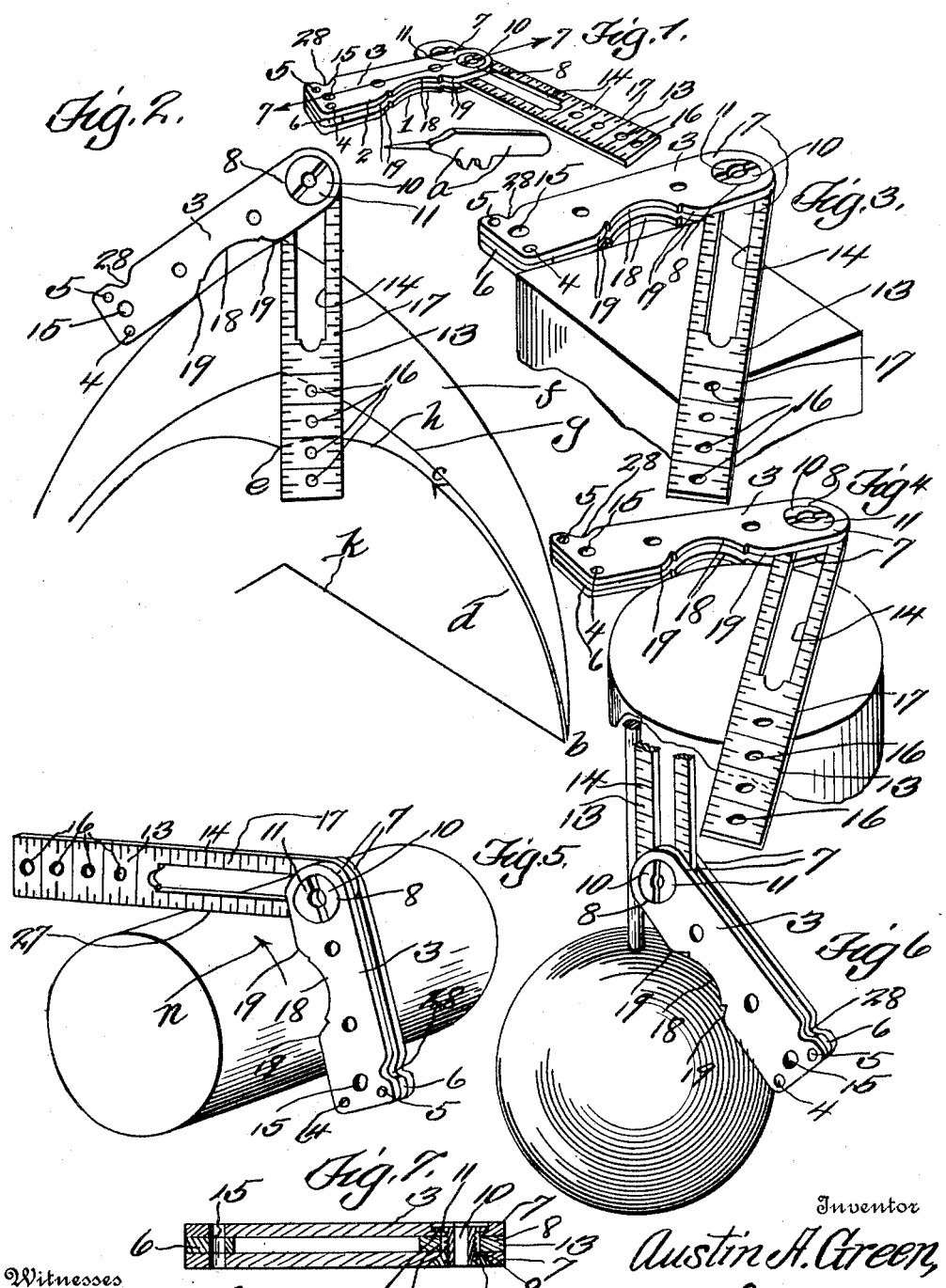

UNITED STATES PATENT OFFICE.

AUSTIN A. GREEN, OF BRUSHTON, NEW YORK.

LENGTH AND WIDTH MEASURING DEVICE.

1,099,597.  Specification of Letters Patent.  Patented June 9, 1914.

Application filed September 3, 1910. Serial No. 580,231.

*To all whom it may concern:*

Be it known that I, AUSTIN A. GREEN, a citizen of the United States, residing at Brushton, in the county of Franklin and State of New York, have invented a new and useful Length and Width Measuring Device; and I do hereby declare the following to be a full, clear, and exact description of the invention, such as will enable others skilled in the art to which it appertains to make and use the same.

This invention belongs to the art of measuring instruments and devices, and it more especially relates to a new and useful improved device, whereby various miters may be marked, with respect to various segmental curvatures.

A further feature of the invention is the fact that this instrument may be used for marking a 45 degree angle on a square block as shown in Figure 3, and by use of the bearings of the handle member the instrument may be positioned upon a circular block to mark radial lines thereon.

A further feature of the invention is the provision of an instrument of this nature, for testing whether a cylindrical shaft or any circular object or device is true or not, as shown in Fig. 5. Furthermore, this instrument may be utilized for ascertaining whether or not a pin or lug, projection or spoke of a wheel extends perfectly radial, especially perfectly radial from any point of a round ball or sphere, as shown in Fig. 6. Furthermore, the instrument may be used for testing the different positions or set, or the angle of the teeth of a circular saw, with respect to the hub or collar, or the center of the saw.

In practical fields the details of construction may necessitate alterations, falling within the scope of what is claimed.

The invention comprises further features and combination of parts, as hereinafter set forth, shown in the drawings and claimed.

In the drawings: Fig. 1 is a view in perspective of the improved instrument. Fig. 2 is a view illustrating how various miters may be marked with the instrument, with respect to various segmental curvatures of the arches of windows and the like, and with respect to various angles as shown. Fig. 3 is a perspective view showing the instrument used in marking the 45 degree angle on a square block. Fig. 4 is a perspective view showing the instrument adjusted upon the identical angle as shown in Fig. 3, said angle passing directly through the center of the circular block. Fig. 5 is a perspective view showing the instrument being used for testing whether or not a cylindrical shaft is true. Fig. 6 is a perspective view showing the instrument adjusted, for testing whether or not a pin or lug, projection or the like extends perfectly radial, especially with respect to the center of a round ball or sphere. Fig. 7 is a sectional view on line 7—7 of Fig. 1, illustrating the construction of the handle member and showing how the slotted member is mounted upon the screw.

Referring more especially to the drawings, 1 and 2 designate the two parts of the handle member 3, which parts are riveted together as indicated at 4 and 5, with a piece of metal 6 secured between them to hold the parts separated. The end 7 of said parts are provided with apertures 8, one being provided with beveled annular walls, while the other is provided with an annular flange 9, and said ends are fastened together by a screw member 10. The head 11 of the screw engages the annular flange 9 of one of the apertures, while the annular washer or nut 12 having a beveled wall, as shown in Fig. 7, engages the beveled part of the other aperture. This threaded washer or nut engages the threads of the screw, for holding the parts of the handle together. Upon this screw the slotted member or blade 13 is fulcrumed, the screw passing through the slot 14, and by tightening or loosening the screw, the slotted member may be clamped in various positions, as shown in the drawings. The handle member at the riveted ends of said parts, is provided with an aperture 15, through which a pointed instrument *a* as shown in Fig. 1 may be inserted for pivoting the device or instrument in place, whereby various segmental curvatures as shown in Fig. 2, or circles may be scribed or drawn, by inserting a pencil point through any one of the apertures 16 of the slotted member, and swinging the instrument on its pivot. This instrument may be used for drawing or scribing the segmental curvature or line *d* between the points *b* and *c* in Fig. 2 by the instrument *a* being inserted in the aperture 15, and the pencil through one of the apertures 16 of the slotted member. And then by holding the handle member stationary, and swinging the slotted member on its pivot with the handle member, the segmental curvature or line between c and e may be scribed or drawn.

The slotted member is provided with a plurality of graduations 17, whereby measurements may be made, and also through the medium of the slot of the member 13, the same may be adjusted in various adjusted positions. The handle member is provided with a machined out portion 18 having rounded corners upon each side thereof, constituting bearings 19. By placing the instrument as shown in Fig. 2, using the bearings 19 to engage or register with the segmental curvature as shown, a true perpendicular miter may be drawn, and then cut. In cutting one side of a window top or frame top in this manner, the miter of one side will squarely fit when placed upon the opposite side and vice versa. It will be seen that a true miter may be easily marked, regardless of the contour of the segmental curvature or angle, there being several segmental curvatures indicated at f, g and h, and k.

By placing the instrument as illustrated in Fig. 3, a 45 degree angle may be marked upon a square block, then by leaving the handle member and the slotted member to remain in the positions as shown relative to one another in Fig. 3, the same angle or transverse line may be drawn exactly centrally through a circular block, regardless of what position the handle member is disposed relative to the periphery of the block, as shown in Fig. 4. Furthermore, upon reference to Fig. 6, it may be ascertained whether or not a pin or lug, projection or spoke extends perfectly radial relative to a round ball or sphere, regardless of what position the handle member is disposed relative to the sphere.

As shown in Fig. 5 the instrument may be utilized for ascertaining or testing whether or not a cylindrical shaft or wheel is perfectly true. This is accomplished by disposing the slotted member and the handle member in such wise that the slotted member will engage the shaft at 27, while the bearings 19 will engage the shaft at other locations. Then by moving the instrument circumferentially about the circumference of the shaft, in either direction as indicated by the arrow n, the slotted member and the handle member being first tightened by the screw member 10, the unevenness or any irregularities of the circumference of the shaft may be plainly seen, owing to the fact that the slotted member will not engage a hollow, or if the slotted member engages a raised portion, one of bearings 19 will be raised out of engagement with the shaft. Moreover, the tool or instrument may also be utilized for testing the disposition or set or the pitch of the teeth of a circular saw, by arranging the handle member, so that the bearing 19 may engage the collar or hub of the circular saw, the slotted member being arranged so that one of its edges is parallel with the inclined edge of one of the teeth. Then by moving the handle member about the collar, in a manner as may be ascertained from Fig. 5, it will be seen whether or not the remaining teeth have the same inclination. Then by reversing the instrument, the opposite angled edges of the teeth may be tested. However, an illustration of this feature is not shown through the lack of sufficient space. The handle member upon the opposite edge is provided with a smaller machined out portion 28, which may be used in a manner similar to the machined out portion 18.

The invention having been set forth, what is claimed as new and useful is:—

In a measuring device, the combination of a handle member composed of two parts having a space between them and being riveted together at one end thereof, said handle member having an aperture in one end thereof, while the other end is provided with a threaded clamping device passing through the ends of the two parts, a slotted member arranged between the two parts with the threaded device extending through the slot thereof, said slotted member having graduations and a plurality of apertures, said handle member having in one longitudinal edge a machined out portion provided with rounded bearing corners adapted to seat upon curved surfaces.

In testimony whereof I have signed my name to this specification in the presence of two subscribing witnesses.

AUSTIN A. GREEN.

Witnesses:
ELLOTT E. HARRIS,
GEORGE E. MONTEITH.

---

Copies of this patent may be obtained for five cents each, by addressing the "Commissioner of Patents, Washington, D. C."